March 18, 1947.  J. G. ROSALES  2,417,662

METHOD OF BRAZING ALUMINUM

Filed Jan. 1, 1945

JOSEPH G. ROSALES Inventor

By

Attorney

Patented Mar. 18, 1947

2,417,662

UNITED STATES PATENT OFFICE 2,417,662

METHOD OF BRAZING ALUMINUM

Joseph G. Rosales, Los Angeles, Calif., assignor to The Garrett Corporation, Airesearch Manufacturing Company division, Los Angeles, Calif., a corporation of California Application January 1, 1945, Serial No. 570,927

7 Claims. (Cl. 113—112)

My invention relates to the brazing of aluminum and has as its general object to provide a successful method whereby thin walled aluminum parts may be joined together by dipping in molten brazing or filler metal, this application being a continuation-in-part of applicant's copending application, Serial No. 504,835, filed October 4, 1943.

The brazing of aluminum involves a number of difficulties resulting from the characteristics of aluminum and the smallness of the variation between the melting point of the material ordinarily used in such brazing. The aluminum metal employed in thin walled aluminum parts, such as, for example, the heat transfer tubes of an aircraft oil cooler, may have a melting point ranging from 1200° F. down to as low as 1100° F. depending upon the particular aluminum alloy employed. The brazing metal may have a solidification range between 973° F. and 1075° F., the lower temperature being one where the metal commences to melt and the upper temperature being that of the fully liquid state. Most of the brazing metals will have a solidification range falling within these limits, the upper limit varying between about 1060° F. and 1075° F. The brazing flux may have a melting point of between 650° F. (the temperature where the flux begins to melt) and 1060° F. (the temperature at which most fluxes are fully liquid).

All of the fluxes suitable for aluminum brazing will to a greater or less extent attack the aluminum quite rapidly. On thin aluminum walls, this corrosive action may easily result in the walls being substantially weakened. Also, the brazing metal in the molten state and in the presence of flux tends to combine with the aluminum of the walls being brazed to form an alloy having a melting point lower than the melting point of the aluminum. Since the melting point of the brazing metal is usually quite close to that of the aluminum and may actually in some cases be higher, there is the ever present danger of melting away the extremities of the aluminum walls which are dipped in the brazing metal, or at least of melting the aluminum alloy which has been formed on the aluminum walls. As a result of these difficulties, attempts to braze thin walled aluminum tubes by dipping have not been attended with consistent results, and the definite opinion has been developed in the art to the effect that such brazing is impossible or at least commercially impracticable. With these difficulties and this opinion of the art in mind, the primary object of the invention is to provide a dipping process for brazing thin walled aluminum parts which is successful and commercially practicable.

A more specific object of the invention is to provide such a process wherein the time in which the parts are dipped in the brazing metal is reduced to a minimum so as to minimize the tendency of the parts to be melted in the brazing bath.

Another object is to provide a method of brazing thin walled aluminum parts by dipping, wherein the time in which the parts are dipped in the molten flux is sufficiently low so that there will be no appreciable reduction of the aluminum walls as a result of the corrosive or destructive action of the molten flux.

A further object is to provide a process of brazing thin walled aluminum parts by dipping, which process is of such a character as to make it possible to reduce the dipping time and particularly the time of dipping in the brazing metal, to a minimum, and yet, at the same time, to secure a very good bond between the aluminum surfaces.

Toward the achievement of the foregoing objects, the invention contemplates a method of brazing thin walled aluminum articles wherein the aluminum parts are first assembled, then preheated to a temperature in the neighborhood of the melting temperature of the flux, but insufficiently to melt the aluminum, and then, while maintained substantially in this heated condition, is first dipped into the molten flux and, after the determined length of time in the flux, is quickly transferred to the molten brazing metal without substantial loss of heat. The temperature of the brazing metal is maintained very close to the melting point of the aluminum, but I have discovered that it is nevertheless possible to dip the thin walled aluminum parts in the brazing metal for a sufficiently short length of time to avoid any substantial melting thereof and yet attain a good brazed joint, providing that the parts have been properly prepared in the previous steps of the operation. Accordingly, a further object of my invention is to provide a method of brazing thin walled aluminum parts by dipping, wherein the preparatory steps and the length of dipping time are so correlated that the previously encountered difficulties are eliminated, and what was previously considered to be an impossible or impracticable method is actually rendered feasible—namely, the brazing of thin walled aluminum parts by dipping.

Further objects and advantages of the invention will be brought out in the following part of the specification.

Referring to the drawings which are for illustrative purposes only,

Figure 1:
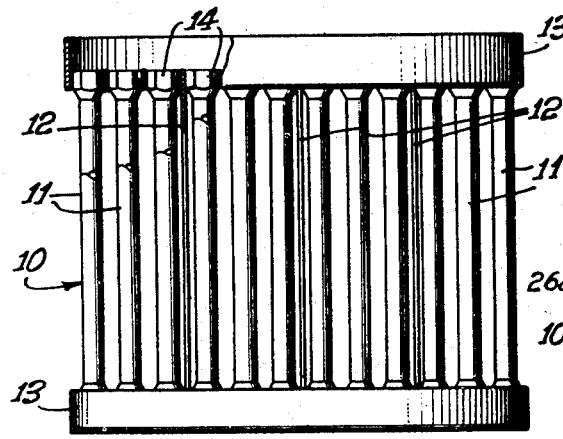
Fig. 1 is a partial sectional view of an oil cooler core assembly which has been brazed by the use of my invention.

The core assembly 10 shown in Fig. 1 comprises a plurality of aluminum tubes 11, a number of baffle plates 12, and bands 13 encircling the ends 14 of the tubes 11. The tube ends 14 are enlarged and are of hexagonal cross section, so that when in engagement they provide an open work wall of honeycomb form.

Figure 2:
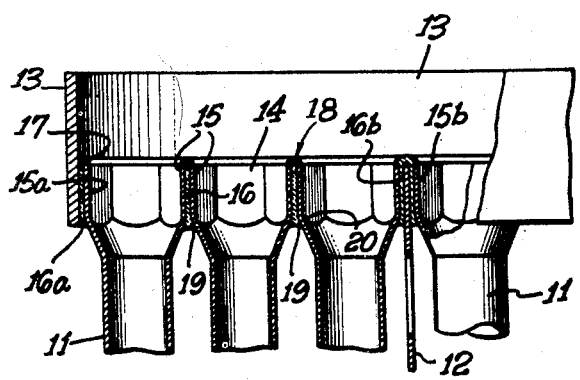
Fig. 2 is an enlarged fragmentary sectional view of a portion of the assembly shown in Fig. 1.

As shown in Fig. 2, the adjacent thin walls 15 of the tube ends 14 are bonded together by thin webs or walls 16 of brazing metal. It will be understood that these webs of brazing metal are shown exaggerated in thickness in Fig. 2, in order that they may be clearly apparent in the drawing. The webs of brazing material may vary in thickness from about .001 in. to .015 or .020 inch, considerably less than the apparent thickness in the drawing.

The walls 15a of the outer tube ends 14 are bonded to the inner surfaces of the band 13 by webs of brazing metal 16a, and the walls 15b of the tube ends 14 adjoining the baffles 12 are bonded thereto by webs of brazing metal 16b.

The practice of the method results in a fillet 17 at the outer edge of the web 16a, and beads of brazing metal 18 along the edges of adjacent tube end walls 15 and 15b. Fillets 19 are formed adjacent the inner extremities of the walls 16, 16a, and 16b, and merge in the flaring walls 20 which join the tube ends 14 to the body portion of the tubes 11. The fillets 19 reenforce the end portions of the tubes 11 and seal the interstices or spaces between the tube ends.

Figure 3:
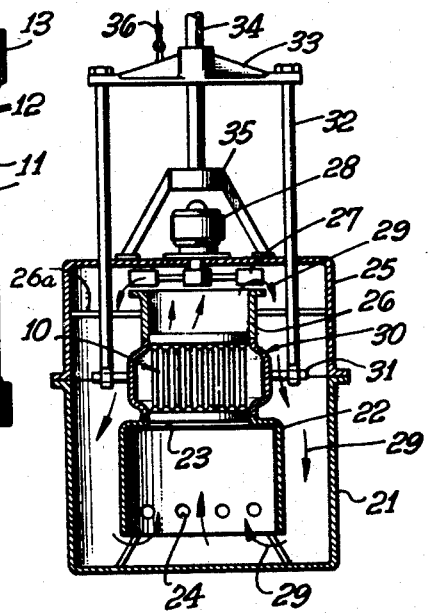
Fig. 3 is a vertical sectional view of schematic character showing the apparatus for heating the core assembly prior to the dipping steps of the process.

In Fig. 3 is shown, diagrammatically, the mechanism for heating the core assembly 10 prior to the dipping step of the process. Such heating mechanism comprises a lower housing member 21 in which is mounted the lower skirt portion 22 of a heater assembly which includes, in addition to the skirt portion 22, a tubular holder 30 in which the core assembly 10 is adapted to be mounted, and an upper collar 26 which is supported, by any suitable means such as the spokes 26a, in an upper housing member 25 which is adapted to register with the lower housing member 21 to form a closed chamber in which air, heated by a plurality of heating elements 24, mounted in the lower skirt member 22, may be circulated by a fan 27 in the path indicated by the arrows 29. Such path will carry the heated air upwardly through the core 10 and the collar 26, thence downwardly in the annular space between the heater assembly and the housing 21, 25, the air being recirculated until it is brought to the proper temperature, and thereafter, so as to maintain said temperature for a predetermined length of time.

The bands 13 of the core assembly are adapted to snugly fit within the constricted end portions of the holder member 30 and be supported by frictional engagement therewith. The bands 13 are also adapted to project beyond the ends of the holder 30 so that the lower band may be received in an opening 23 in the top of the skirt member 22, and the upper band may be received in the lower region of the collar member 26. Thus the core member joins the three separable parts of the heater assembly to form a continuous circulatory flue.

Attached to the holder member 30 are diametrically opposed trunnions 31 which are journaled in bearings at the lower ends of supporting rods 32, suspended from a yoke 33, which, in turn, is slidably mounted on a shaft 34 and adapted to be raised by a cable 36 attached thereto. The shaft 34 is attached by a bracket 35 to the top of the upper housing member 25 and serves as a means for lifting the housing member 25. By first lifting the housing member 25 (which will raise the collar member 26 away from the top of the holder 30) and then raising the holder 30, by means of the yoke 33 and suspension rods 32 to a position intermediate the skirt member 22 and the collar 26, it will be possible to engage the holder 30 with a suitable hook or bar and rotate it around the axis of the trunnions 31 180° to an inverted position in which it may be reassembled between the skirt 22 and the collar 26 by lowering the upper casing member 25 and the yoke 33 respectively. This makes it possible to attain uniform heating of the core during the heating step.

Figure 4:
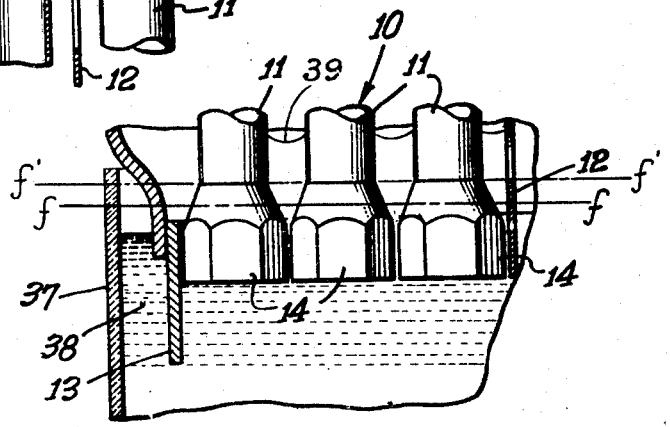
Fig. 4 is an enlarged fragmentary sectional view of a dipping apparatus, representative of both the flux pot and the brazing pot.

The process is carried out as follows:

Precleaned, degreased, tubes 11, baffles 12, and bands 13 are assembled into a core unit 10 substantially as shown in Fig. 1. This core unit is placed in the holder 30 at a time when the upper housing member 25 and its associated parts are raised and shifted laterally from the lower housing member 21. The holder 30 is then raised to engagement with the collar 26 and the upper band 13 inserted into the collar 26. The upper casing member 25 is moved to a position above the lower casing member 21 and is lowered so as to bring the projecting lower portion of the lower band 13 into the opening 23 of the skirt member 22. The motor 28 is then operated to produce a high velocity circulation of heated air and gases, in the path 29, whereby the core assembly is heated gradually to the preheat temperature. When this temperature has been attained, the upper casing member 25 and the holder 30 are jointly raised from the lower casing member 21 and transferred to a position over a pot containing molten flux, from which position it is quickly lowered, without substantial loss of time, so as to immerse the lower end of the core assembly 10 in the flux, as shown in Fig. 4, wherein the flux pot is indicated at 37 and the molten flux at 38. The core assembly is dipped to such a depth as to bring substantially all of the expanded end portions 14 of the tubes below the upper level (indicated at f—f) of the flux. Capillary action will cause the flux to travel upwardly above the level of immersion to the level indicated at 39, completely covering the tube ends 14.

When the core has remained in the flux bath for a sufficient length of time, it is lifted from the bath with a quick jerk or a vertical shaking motion, so as to remove the excess flux. The upper housing member 25, the holder 30, and the core are then removed to the brazing pot and lowered to bring the face of the core into the molten brazing metal, as shown in Fig. 4. Capillary action and coherence between the molten brazing metal and the aluminum cause the brazing metal to travel upwardly in the interstices between the parts to thereby form the fillets 19, shown in Fig. 2. The core is allowed to remain in the brazing bath only sufficiently long to permit the brazing metal to travel upwardly, as stated above, and is then removed with a jerk or shaking movement to dislodge excess brazing metal which may tend to remain in the openings of the tube ends 14, and to remove drops of molten metal which tend to adhere to the ends of the aluminum walls.

The upper housing member 25 is allowed to remain in a position largely covering and enclosing the holder 30 so as to minimize the loss of heat.

Upon completion of the brazing of one end of the core, the holder is dropped and then rotated end for end so as to bring the unbrazed end into position for dipping into the flux and brazing baths. The dipping steps are then repeated upon this other end of the core.

Upon completion of the second brazing operation, the core assembly is cooled. This cooling step may be performed while retaining the brazed core assembly in the holder 30, but is preferably performed in a separate tempering and cooling chamber, wherein the temperature is controlled.

After removal from the tempering chamber, the core is permitted to cool to approximately room temperature, and is then washed in a solution capable of removing therefrom all adhering flux material. Finally, the core is rinsed in a spray or bath of clean hot water.

An important aspect of the invention is the correlation of time and temperature and the durations of the various steps, the temperatures at which these steps are performed and the critical temperatures (such as melting points of the materials) employed. In the preheating step, the core is heated to a temperature which approaches the melting range of the aluminum to be brazed, and which lies either within or just below the melting range of the brazing metal. For example, where the melting range of the brazing metal lies between about 970° F. (where the metal begins to soften) and about 1070° F. (where the metal is completely liquefied), and that of the aluminum between about 1100° F. and 1200° F., or between about 1140° F. and 1230° F., the core is preheated to a temperature of between 950° F. and 1000° F., the preheat temperature being preferably higher for the aluminum having the higher melting range. The temperature of the atmosphere within the heating chamber, while it must be necessarily at least as high as the temperature to which the core is preheated, is maintained low enough so that the core may be preheated for a period as long as fifteen minutes, and preferably not less than thirty minutes, in order that the core may be thoroughly heated throughout to a temperature near or within the melting range of the brazing material and yet sufficiently below that of the melting range of the aluminum to be brazed to avoid melting or deteriorating the aluminum.

The flux is maintained at a temperature somewhat higher than the temperature to which the core has been preheated, and either slightly below or slightly above the low limit of the melting range of the aluminum being brazed. The temperature of the core is increased somewhat in the flux bath, to a level which may be somewhat lower or somewhat higher than the temperature of the molten brazing metal, but in any event, is fairly close to that temperature. With a somewhat higher flux temperature, for example, 1130° F., the core is kept in the flux a relatively short time—for example, in the neighborhood of twenty seconds—but in the preferred method, the flux temperature is maintained at a somewhat lower level—for example, 1100° F. to 1120° F.—and the core is permitted to remain in the flux a somewhat longer period of time—for example, in the neighborhood of three minutes.

The brazing metal temperature is controlled within closer limits than either the preheat temperature or the flux temperature, and the length of time the core is allowed to remain in the brazing bath is considerably less than the length of time in the flux bath. For example, an aluminum core may be permitted to remain in a brazing bath of between 1090° F. and 1100° F. temperature for a period of from five to ten seconds, while a similar core will be held in a brazing bath having a temperature of between 1095° F. and 1105° F. for a period of only from one-half to one and one-half seconds.

It is to be noted that the brazing temperature of each of the instances given is somewhat lower than the flux temperature. This provides an allowance for the lowering of the melting point of the aluminum through the alloying of the brazing metal therewith, and makes it possible for the core to lose a few degrees of temperature in the transfer from the flux bath to the brazing bath without dropping below the melting point of the brazing metal. This in turn makes it possible for the brazing metal to adhere to the core practically instantaneously and, consequently, for the duration of the brazing dip to be reduced to a relatively short interval, minimizing the alloying action and the tendency for the aluminum to dissolve in the brazing metal.

An important aspect of the invention is the protection of the core against loss of heat during the transfer from the flux to the brazing bath so that the core temperature may be maintained quite close to the melting point of the brazing metal. It is also important that the time consumed in transferring the core from the preheat furnace to the flux bath and from the flux bath to the brazing pot be kept at a minimum.

One example of a successful method embodying the invention is as follows:

A core of aluminum having a melting range between about 1100° F. and 1200° F. is preheated for a period of between fifteen and twenty-five minutes to a temperature of about 1100° F. and above the upper limit of the melting range (about 1075° F.) of the brazing metal which is used. It is then quickly transferred, while shielded against the loss of heat, to a bath of molten flux material having a melting point of between about 650° F. (initial softening temperature) and 1060° F. (temperature of complete fluidity). The flux bath is maintained at a temperature between about 1100° F. and 1130° F., which is higher than the preheat temperature and within the melting range of the aluminum. The end of the core is maintained in the flux bath for a period of about twenty seconds. The depth of dip in the flux bath may range between a quarter of an inch and two inches. The core is then quickly transferred, while being shielded against loss of heat, to a brazing bath maintained at a temperature of between 1090° F. and 1100° F., lower than the flux temperature, and is dipped therein to a depth of between one eighth of an inch and three sixteenths of an inch for a period of between five and ten seconds. The dipping operation is repeated in each bath after the core has been turned end for end. After being removed from the brazing bath, the core is permitted to cool in a tempering chamber to a temperature of about 500° F.

Another example of the invention representing a preferred method, is as follows:

A core of aluminum having a melting range between about 1130° F. and 1200° F. or a melting range between about 1133° F. and 1230° F., or some intermediate range, is preheated for a period of not less than thirty minutes in a circulating air furnace maintained at a temperature of between about 950° F. and 1000° F. (a higher temperature for a higher melting range). The core is then quickly transferred, while being shielded against loss of heat, to a flux bath of material having a melting point between about 650° F. (initial softening temperature) and 1060° F. (temperature of complete fluidity) which bath is maintained at a temperature of between about 1100° F. and about 1120° F. (a higher temperature for the aluminum of higher melting range). The high temperature of the flux gives quick wetting of the core surfaces by the flux, the adherence of flux to the core, and brings the core temperature to a sufficiently high level to enable the brazing metal to quickly adhere to the core surfaces. The core is dipped into the bath to a depth of about one inch and maintained therein for a period of about three minutes. While in the bath, the core is revolved (180° at the end of the first and second minutes) in order to very slightly agitate the bath and facilitate the removal of scale. This may be accomplished by revolving the entire assembly of core, upper heat chamber housing member and supporting mechanism. Thereafter, the core is immediately transferred, while being shielded against loss of heat, to a pot of molten brazing material having a melting range of between 970° F. (initial softening temperature) and 1070° F. (full fluidity) which bath is maintained at a temperature of between 1095° F. and 1105° F. The fluxed end of the core is dipped in the brazing metal to a depth of about one quarter inch and the core is maintained in the brazing metal a relatively short period of between one half and one and a half seconds. The core is jerked from the bath so as to dislodge excess brazing material, and the flux is drained from the core by tilting. The core is allowed to cool for one minute and is then inverted. Each of the dipping operations is then repeated. After the completion of the second brazing operation, the core is permitted to cool for a period of about one minute to a temperature of about 960° F. Subsequently, it is quenched by circulating cool air through it and is washed by an air water gun.

I claim as my invention:

1. The method of brazing a core assembly of the character described, having aluminum tubes with enlarged ends, wherein the core assembly is dipped in a flux and then in a filler metal, comprising: heating the core assembly to a temperature of about the melting point of the filler metal, but lower than the melting point of the aluminum; guarding a substantial portion of the walls of said core assembly from material heat loss and, without delay, dipping the lower end of the core assembly in molten flux at a temperature above the melting point of the filler metal a distance of not materially greater than the length of said enlarged ends of said tubes, said lower end of the core being maintained in the molten flux for about twenty seconds, and removing said end from said flux; dipping said end into molten filler metal at a temperature above the melting point of the filler metal to a depth less than the length of said tube ends and for a period of time corresponding to the range of five to ten seconds and removing the end from the filler metal with a shaking motion so as to dislodge excess filler metal from the dipped portion of the assembly; reversing said core assembly end for end, and, while continuing the guarding thereof against material loss of heat, dipping the other end thereof first in the molten flux, and then the molten filler metal substantially as set forth with relation to the first end of the core assembly; cooling said core assembly in a manner to avoid rupture of the brazed joints; and removing from the brazed core assembly the adhering flux.

2. The method of brazing a core assembly of the character described, having aluminum tubes with enlarged ends, wherein the core assembly is dipped in a flux and then in a filler metal, comprising: heating the core assembly to a temperature of about the melting point of the filler metal, but lower than the melting point of the aluminum; guarding a substantial portion of the walls of said core assembly from material heat loss and, without delay, dipping the lower end of the core assembly in molten flux at a temperature above the melting point of the filler metal a distance of not materially greater than the length of said enlarged ends of said tubes, said lower end of the core being maintained in the molten flux for about twenty seconds, and removing said end from said flux; dipping said end into molten filler metal at a temperature above the melting point of the filler metal to a depth less than the length of said tube ends and for a period of time corresponding to the range of five to ten seconds and removing the end from the filler metal with a shaking motion so as to dislodge excess filler metal from the dipped portion of the assembly; and reversing said core assembly end for end, and, while continuing the guarding thereof against material loss of heat, dipping the other end thereof first in the molten flux, and then the molten filler metal substantially as set forth with relation to the first end of the core assembly.

3. The method of brazing a core assembly of the character described, having aluminum tubes with enlarged ends, wherein the core assembly is dipped in a flux and then in a filler metal, comprising: heating the core assembly to a temperature of about the melting point of the filler metal, but lower than the melting point of the aluminum; then, without delay, so as to avoid material loss of heat, dipping the lower end of the core assembly in molten flux at a temperature above the melting point of the filler metal a distance of not materially greater than the length of said enlarged ends of said tubes, said lower end of the core being maintained in the molten flux for a period of time not materially greater than twenty seconds, and removing said end from said flux; and dipping said end into molten filler metal at a temperature above the melting point of the filler metal to a depth less than the length of said tube ends and for a period of time not materially greater than ten seconds and removing the end from the filler metal and with a shaking motion dislodging excess filler metal from the dipped portion of the assembly.

4. The method of brazing a core assembly of the character described, having aluminum tubes with enlarged ends, wherein the core assembly is dipped in a flux and then in a filler metal, comprising: heating the core assembly to a temperature of about the melting point of the filler metal, but lower than the melting point of the aluminum; then without delay, so as to avoid material loss of heat, dipping the lower end of the core assembly in the molten flux at a temperature above the melting point of the filler metal a distance of not materially greater than the length of said enlarged ends of said tubes, said lower end of the core being maintained in the molten flux for a period of time not materially greater than twenty seconds, and removing said end from said flux; dipping said end into molten filler metal at a temperature above the melting point of the filler metal to a depth less than the length of said tube ends and for a period of time not materially greater than ten seconds and removing the end from the filler metal with a shaking motion so as to dislodge excess filler metal from the dipped portion of the assembly; reversing said core assembly end for end, and, without delay so as to avoid material loss of heat, dipping the other end thereof first in the molten flux, and then the molten filler metal substantially as set forth with relation to the first end of the core assembly; cooling said core assembly in a manner to avoid rupture of the brazed joints; and removing from the brazed core assembly the adhering flux.

5. The method of brazing a core assembly of the character described, having aluminum tubes with enlarged ends, wherein the core assembly is dipped in a flux and then in a filler metal, comprising: heating the core assembly to a temperature of about the melting point of the filler metal, but lower than the melting point of the aluminum; then without delay, so as to avoid material loss of heat, dipping the lower end of the core assembly in the molten flux at a temperature above the melting point of the filler metal a distance of not materially greater than the length of said enlarged ends of said tubes, said lower end of the core being maintained in the molten flux for a period of time not materially greater than twenty seconds, and removing said end from said flux; dipping said end into molten filler metal at a temperature above the melting point of the filler metal to a depth less than the length of said tube ends and for a period of time not materially greater than ten seconds; removing the end from the filler metal and cooling the same; and treating the core assembly so that it will be relieved of further destructive action of flux.

6. The method of brazing a core assembly of the character described having aluminum tubes with enlarged ends, wherein an end of the core assembly is dipped in a flux and then in a brazing metal, comprising: heating the core assembly to a temperature of not less than 950° F. but below the melting point of the aluminum tubes; then, without delay, so as to avoid material loss of heat, dipping an end of the core assembly in molten flux maintained at a temperature between 1100° F. and 1130° F. for a period of time not less than about 20 seconds and not more than about three minutes; removing said end from the molten flux and, without delay, dipping said end in molten brazing metal maintained at a temperature of at least 1090° F. for a period of time not exceeding 10 seconds; and removing said end from the molten brazing metal.

7. The method of brazing a core assembly of the character described having aluminum tubes with enlarged ends, wherein an end of the core assembly is dipped in a flux and then in a brazing metal, comprising: heating the core assembly to a temperature of not less than 950° F. but below the melting point of the aluminum tubes; then, without delay, so as to avoid material loss of heat, dipping an end of the core assembly in molten flux maintained at a temperature between 1100° F. and 1130° F. for a period of time not materially greater than 20 seconds; removing said end from the molten flux and, without delay, dipping said end in molten brazing metal maintained at a temperature of at least 1090° F. for a period of from approximately ½ second to approximately 10 seconds; and removing said end from the molten brazing metal.

JOSEPH G. ROSALES.

REFERENCES CITED

The following references are of record in the file of this patent:

UNITED STATES PATENTS

| Number | Name | Date |
| --- | --- | --- |
| 845,304 | Kinnear | Feb. 26, 1907 |
| 2,298,996 | Woods | Oct. 13, 1942 |
| 709,899 | Grant | Sept. 30, 1902 |
| 893,812 | Provost | July 21, 1908 |
| 935,723 | Zimmermann | Oct. 5, 1909 |
| 1,608,735 | Haas et al. | Nov. 30, 1926 |
| 2,001,186 | Dornier | May 14, 1935 |
| 2,299,166 | Miller | Oct. 20, 1942 |